May 28, 1940. C. H. LEAF 2,202,498
MACHINE AND METHOD FOR COOLING POWDERED PRODUCTS
Filed Oct. 27, 1938 2 Sheets-Sheet 1

Inventor
Carl H. Leaf
By Stryker & Stryker
Attorneys

May 28, 1940. C. H. LEAF 2,202,498
MACHINE AND METHOD FOR COOLING POWDERED PRODUCTS
Filed Oct. 27, 1938 2 Sheets-Sheet 2
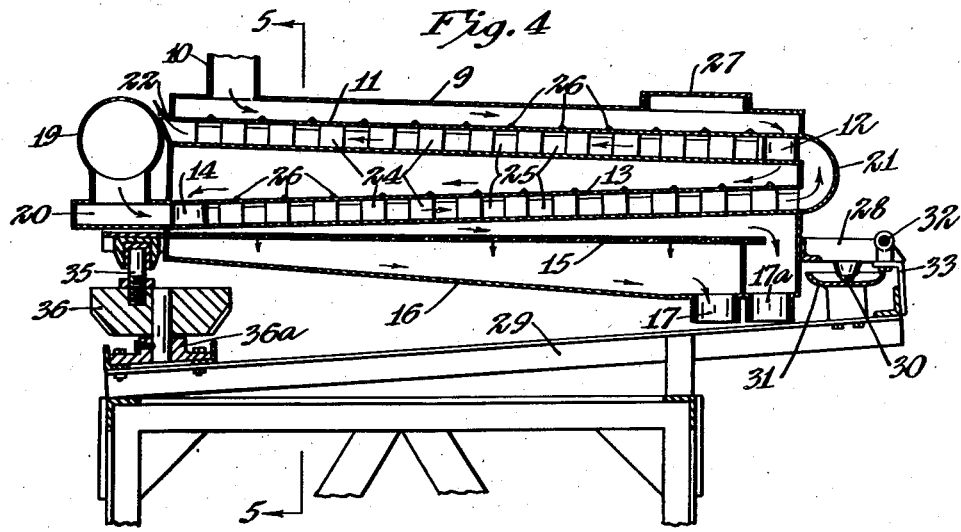
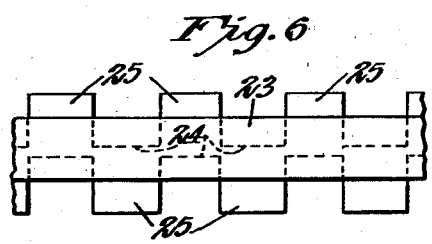
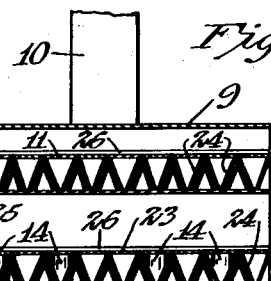
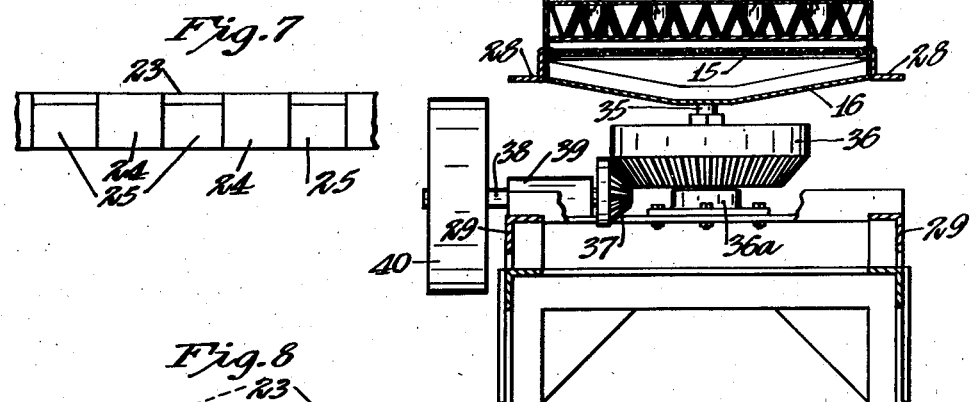
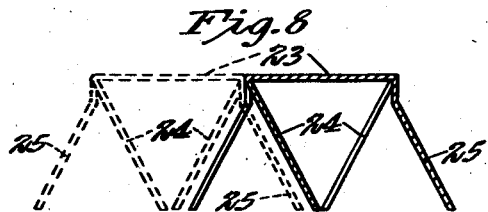
Inventor
Carl H. Leaf
By Stryker & Stryker
Attorneys Patented May 28, 1940

2,202,498

UNITED STATES PATENT OFFICE 2,202,498

MACHINE AND METHOD FOR COOLING POWDERED PRODUCTS

Carl H. Leaf, Luck, Wis., assignor to Land O' Lakes Creameries, Inc., Minneapolis, Minn., a corporation of Minnesota Application October 27, 1938, Serial No. 237,291

8 Claims. (Cl. 62—95)

This invention relates to the cooling of powdered products such, for example, as skim or whole milk powders which are delivered from the dryers at such elevated temperatures that their quality and uniformity of texture are detrimentally affected by sealing in containers without preliminary cooling.

In the manufacture of such powders by the spray method they are delivered from the spray chamber at temperatures in excess of 80° Fahrenheit and are ordinarily packed without sufficient cooling in barrels each containing about 200 pounds of the product. These barrels have moisture-proof liners and are of such heat insulating character as to retain the heat in the powder for a considerable period of time. When the powder is enclosed in such barrels at a temperature as low as 80° Fahrenheit the heat destroys the natural flavor, causing an off-flavor which is undesirable, and when packed at a higher temperature the powder becomes lumpy as well as off-flavor. The quality of the powder for use in the baking industry is also detrimentally affected by packing at temperatures substantially in excess of 80° Fahrenheit.

It is an object of this invention to provide a novel machine for quickly cooling milk powder and other fine powdered products to a temperature below 80° Fahrenheit preparatory to packing in bulk.

A further object is to provide a machine of this kind wherein the powder is cooled in an enclosed passage by contact with a chilled, heat-conducting surface upon which it is caused to move in a thin layer or stream.

Another object is to provide an efficient machine adapted to cool powder in an enclosed passage where desirable sanitary conditions are maintained and detrimental absorption of atmospheric moisture is prevented.

A still further object is to provide an economical method of cooling powdered products which does not interrupt the continuous flow of the powder from the drier to bulk containers in which it is to be sealed.

Other objects will appear and be more fully pointed out in the following specification and claims.

Referring to the accompanying drawings:

Fig. 4 is a central, vertical, longitudinal section through the upper portion of the machine;

Fig. 5 is a vertical cross section taken on the line 5—5 of Fig. 4;

Figs. 6 and 7 are fragmentary plan and side views respectively showing one of the elements of the cooling plate with the radiating fins formed thereon;

Fig. 8 is an enlarged cross section through one of the plate elements with integral fins and with an adjoining element shown in dotted lines.

Figure 1:
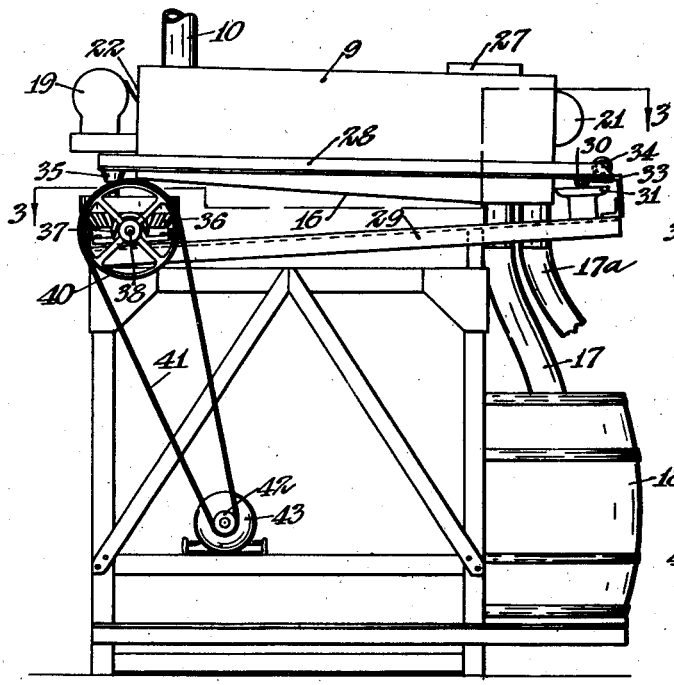
Figure 1 is a side elevation of my cooling machine and showing a barrel in position to receive the cooled product.
Figure 2:
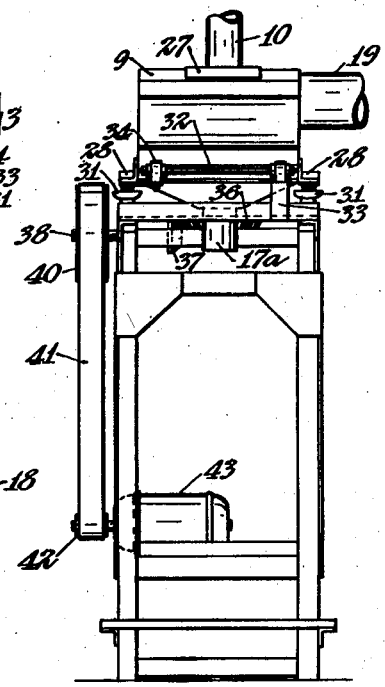
Fig. 2 is an end view of the machine.
Figure 3:
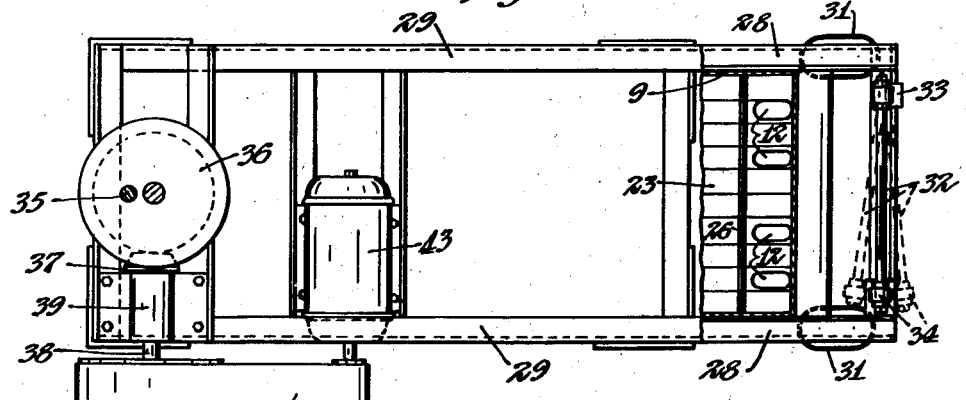
Fig. 3 is a horizontal section taken on the line 3—3 of Fig. 1.

The machine has a long and relatively narrow casing 9 to which the powder to be cooled is admitted near one end and at the top through a conduit 10. The conduit is flexible and extends to the dryer (not shown). The powder falls from the conduit 10 onto the upper end of an inclined plate 11 extending from side to side and from end to end of the casing and arranged to deliver the powder through a series of tubes 12 (Figs. 3 and 4) onto the upper end of a second inclined plate 13. The latter is located beneath the plate 11 and slopes in the reverse direction to discharge the powder through outlet tubes 14 onto the upper end of an inclined screen 15 of common type. The inclination of the plates 11 and 13 is insufficient to cause the powder to flow thereon by gravity alone or in the absence of agitation by shaking or jigging mechanism, as hereinafter described. The fine powder which sifts through this screen is caught on a sloping receptacle 16 and is discharged from the machine through a conduit 17 extending into a container 18 (Fig. 1) suitable for collecting and shipping the product. The particles rejected by the screen are discharged from its lower end and pass out of the machine through a conduit 17a.

The plates 11 and 13 are constructed from thin sheet metal having good heat conducting characteristics and during the operation of the machine these plates are continuously cooled by a draft of cool air admitted through a large conduit 19 communicating with an air passage 20 extending beneath the plates 13 and 11. The air passes first in contact with the bottom surface of the plate 13, then upward through a U-shaped connection 21 and along the bottom surface of the plate 11, being discharged to the atmosphere through an opening 22 at the upper end of the plate 11.

To conduct the heat from the plates 11 and 13 to the air flowing in the passage 20, I prefer to construct these plates from a series of longitudinally extending elements, such as those illustrated in Figs. 6, 7 and 8. Each element has a rectangular top strip 23 joined at its side edges to similar strips extending longitudinally of the casing and forming the plane inclined surfaces of the plates 11 and 13. Integral with the longitudinal side edges of the strips 23 are fins 24 and 25 which project obliquely down into the air passage 20 to secure maximum radiation without waste of material. The flanges forming the fins 24 and 25 are slotted vertically at regular intervals and the fins 24 and 25 adjoining each other along a given side edge of a strip 23 project obliquely in opposite directions from the vertical plane through the side edge. As will be evident from Fig. 8, this results, when the strips 23 are joined together, in placing the fins 25 of one strip 23 in a position parallel to and slightly spaced from the fins 24 of the adjoining strip. This allows air to pass along both faces of all of the fins.

Extending across the upper surfaces of the plates 11 and 13 are series of ridges 26 of inverted V shape preferably formed by small angle bars of thin sheet metal soldered or otherwise secured to the supporting plates. These ridges project only a fraction of an inch and perform the function of turning the powder over as it passes along the cooling plate. A removable cap 27 is provided at the top of the casing 9 and above the lower end of the plate 11 to permit inspection of the interior during operation.

The casing 9 and receptacle 16 are rigidly connected together and supported as a unit on longitudinally extending frame members 28. These frame members are movably supported on a stand having spaced parallel members 29 at the top. Ball casters 30 are mounted on the bottom surfaces of the frame members 28 near one end of the cooler to run on dish-shaped plates 31 secured to the members 29. Movement of the members 28 carrying the casing 9 relative to the plates 31 is limited by a horizontally extending rod 32 which has one end pivotally fastened by a bracket 33 to the members 29 and the other end joined to the frame member 28 by a swivel member 34. The frame members 28 near their ends opposite the rod 32 have a journal bearing for a vertical crank pin 35. This pin is rigidly fixed in the upper face of a large gear 36 at an eccentric point. A bearing 36a is provided for the gear 36 on the frame members 29 and this gear is of the bevel type arranged to be driven by a pinion 37 fixed on a shaft 38 having a bearing 39 on the frame. A pulley 40 is secured to the shaft 38 to be driven by a belt 41 and the latter is arranged to be driven by a pulley 42 fixed on the shaft of an electric motor 43.

Figure 9:
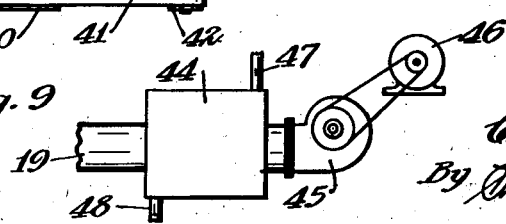
Fig. 9 is a diagrammatic illustration of a suitable arrangement of blower and air cooler for the machine.

As shown diagrammatically in Fig. 9, the air for the conduit 19 is passed through a cooler 44 by a fan or blower 45, the latter being driven through suitable connections with an electric motor 46. A cooling medium, such as cold water or brine, may be sprayed into or otherwise distributed within the cooler 44, being admitted by a pipe 47 and discharged through a pipe 48. Other methods of cooling the air will be obvious to those skilled in this art. It has been found that the water or other cooling medium should be supplied at a sufficiently low temperature to temper the air to about 60° Fahrenheit.

In operation, I prefer to supply the powder cooler continuously with air at a temperature of 60° or lower Fahrenheit and under sufficient pressure to give a fairly high velocity in the passage 20. Flexible portions of the conduits 10 and 19 permit the necessary shaking movement of the casing 9 and attached screen. The conduit 10 continuously delivers the hot powder from the drier to the cooling plates 11 and 13 and the motor 43 is continuously operated so that the gear 36 rotates the eccentric crank 35 to impart a jigging or substantially horizontal shaking motion to the powder cooler and screen 15. This motion causes the powder to be spread uniformly on the plates 11 and 13 and to flow in a thin layer or shallow stream down these inclined plates and over the ridges 26. The powder falls from the lower end of the plate 11 through the tubes 12 to the upper end of the plate 13 and thence passes along the plate 13 to the outlet tubes 14 which discharge onto the screen 15. All of the fine powder passes through this screen, is collected in the receptacle 16 and flows out through the conduit 17 into the container 18. The coarser particles and lumps are rejected by the screen and fall from the lower end of the screen 15 into an outlet passage 17a. The cooling air passes at the required velocity from the conduit 19 through the passage 20 along the bottom surface of the plate 13, thence through the connection 21 and along the bottom surface of the plate 11 being finally discharged through the opening 22. My arrangement of the fins 24 and 25 integral with the strips 23 forming the plates 11 and 13 insures a rapid transfer of heat to the air flowing in the passage 20. The ridges 26 also promote uniform and rapid transfer of heat from the powder to the plates 11 and 13. The temperature of the powder as it is finally discharged into the container 18 is substantially below 90° Fahrenheit so that the container may be sealed when filled and the powder is preserved with its natural flavor and uniform fineness.

My improved machine may be used for the cooling of numerous powders other than milk powder such, for example, as egg yolk, blood, yeast and lemon, orange and pineapple juices. The cooling chamber may be mounted on or attached to any commercial sifting machine or it may be supported independently of the sifting machine and supplied with any suitable mechanism for shaking or oscillating the device to cause the powder to flow or slide along the inclined cooling surfaces.

Having described my invention, what I claim as new and desire to protect by Letters Patent is:

1. A machine for cooling powdered food products comprising, a casing, an inclined plate disposed in said casing for supporting the powder to be cooled, said plate being formed from a plurality of strips of heat conducting sheet material secured together at their side edges and each having radiating fins projecting down from its edges, means for supplying the powder to the upper end of said plate, an outlet for the powder extending from the lower end of said plate, a passage for air extending beneath said plate and containing said fins, means for passing cool air through said passage and means for shaking said casing to distribute the powder on said plate and to cause it to flow longitudinally thereof to said outlet.

2. A machine for cooling powdered food products comprising, a long and relatively narrow casing, upper and lower, oppositely inclined plates disposed in said casing one above the other for supporting the powder to be cooled, means for supplying the powder to the upper end of the upper plate, means for delivering the powder from the lower end of the upper plate to the upper end of the lower plate, an outlet for the powder extending from the lower end of the lower plate, a continuous passage for air extending beneath both of said plates in said casing, a multiplicity of heat radiating fins projecting down from said plates into said passage, means for cooling air and forcing it through said passage and power-driven means for shaking said casing to distribute the powder on said plates and to cause it to flow longitudinally thereof from one of said plates to the other and out through said outlet.

3. The method of preparing hot milk powder for packing in bulk, which comprises, agitating the hot powder sufficiently to cause it to flow in a thin layer down a path from which the atmosphere is substantially excluded and at an angle to the horizontal insufficent to cause the powder to flow without said agitation, and cooling the powder during said flow by passing a stream of relatively cold air in heat exchange relation with the powder but out of contact therewith and in such manner as to progressively remove heat from said powder.

4. The method of cooling hot powdered material which comprises, delivering said powder onto a heat conducting surface having an angle with the horizontal insufficient to cause said powder to flow by gravity, flowing said powder down said surface in a path substantially closed from the atmosphere by shaking said surface, and cooling said powder by passing a stream of cooling medium in heat exchange relation with said powder through said surface and out of contact with said powder and in such manner as to progressively remove heat from said powder.

5. The method of cooling hot powdered material which comprises, delivering said powder onto a heat conducting surface having an angle with the horizontal insufficient to cause said powder to flow by gravity, flowing said powder down said surface in a path substantially closed from the atmosphere by shaking said surface, and cooling said powder by passing a stream of cooling medium countercurrent with the flow of said powder in heat exchange relation with said powder through said surface but out of contact with said powder and in such manner as to progressively remove heat from said powder.

6. The method of cooling hot milk powder from a temperature in excess of 80° F. for packing in bulk, which comprises, agitating the hot powder sufficiently to cause it to flow in a thin layer down a path from which the atmosphere is substantially excluded and at an angle to the horizontal insufficient to cause the powder to flow without said agitation, and cooling the powder during said flow by passing a stream of air at a temperature not exceeding 60° F. in heat exchange relation with the powder but out of contact therewith and in such manner as to progressively remove heat from said powder.

7. Apparatus for cooling heated powder, which comprises, a casing substantially closed from the atmosphere, a heat conducting member in said casing disposed at an angle to the horizontal, said angle being insufficient to cause powdered material to flow along said member by gravity, an inlet conduit communicating with said casing for delivering powder upon said member adjacent the upper end thereof, means for shaking said member to cause said powder to flow in a thin stream along said member, a passage for a cooling medium adjacent said member for conducting said cooling medium in heat exchange relation with said member while preventing contact between said cooling medium and said powder, means for causing flow of said cooling medium through said passage to cool said powder, and means for discharging cooled powder from said casing.

8. Apparatus for cooling heated powder, which comprises, a casing substantially closed from the atmosphere, a heat conducting member in said casing disposed at an angle to the horizontal, said angle being insufficient to cause powdered material to flow along said member by gravity, an inlet conduit communicating with said casing for delivering powder upon said member adjacent the upper end thereof, means for shaking said member to cause said powder to flow as a thin stream along said member, a passage for cooling air positioned below said member, said member forming the upper wall of said passage, means for causing a stream of relatively cool air to flow through said passage in contact with said member while preventing contact between said air and said powder to cool said powder by conduction of heat through said member, and means for discharging cold powder from said casing.

CARL H. LEAF.